United States Patent [19]

Kent et al.

[11] 3,931,512

[45] Jan. 6, 1976

[54] LINE DATA AND TELEVISION TRANSMISSION

[75] Inventors: Alan Hugh Kent, Wokingham; Geoffrey Frank Hennell, Iver Heath; George Hedley Storm Rokos, Hitchin; Peter Howard Fell, Maidenhead, all of England

[73] Assignee: Plessey Handel und Investments A.G., Zug, Switzerland

[22] Filed: May 30, 1974

[21] Appl. No.: 474,765

[30] Foreign Application Priority Data
June 1, 1973  United Kingdom............. 26263/73

[52] U.S. Cl. .......... 250/199; 178/DIG. 2; 250/205; 250/227
[51] Int. Cl.² .................................... H04B 9/00
[58] Field of Search........ 250/199, 205, 217 R, 227; 178/DIG. 2, DIG. 29, 7.1; 350/96 B, 96 WG, 169

[56] References Cited
UNITED STATES PATENTS

| | | | |
|---|---|---|---|
| 2,935,558 | 5/1960 | Van Winkle................ | 178/DIG. 29 |
| 3,208,342 | 9/1965 | Nethercot, Jr..................... | 250/199 |
| 3,379,826 | 4/1968 | Gray .................................... | 178/7.1 |
| 3,488,586 | 1/1970 | Watrous et al. .................... | 250/199 |
| 3,731,107 | 5/1973 | Goodwin et al. ................... | 250/227 |

Primary Examiner—Robert L. Griffin
Assistant Examiner—Jin F. Ng
Attorney, Agent, or Firm—Fleit & Jacobson

[57] ABSTRACT

A system for the transmission of television signals comprising a light emitter diode or diodes feeding an optical transmission line, the light output from the optical transmission line being applied to light sensitive semiconductor devices for re-conversion to analogue television signals.

3 Claims, 4 Drawing Figures

LINE DATA AND TELEVISION TRANSMISSION

This invention relates to line data transmission and more especially to television transmission.

According to the present invention a data transmission system suitable for television transmission comprises means for converting data signals to corresponding light signals, optical transmission line means fed at one end from the said means for converting and feeding from the other end thereof means for reconverting the light signals to corresponding electrical data signals.

The system may comprise a light emitting diode L.E.D. coupled for the transmission of the light signals to one end of an optical fibre in response to the application of the analogue electrical television signal to the diode, the other end of the fibre being coupled to feed the light signals to a light detector for recoverting the light signals to analogue electrical television signals.

The light detector may be a reverse biased silicon junction detector and the optical transmission line may be any conventional multimode type of optical fibre.

The television signals transmitted in the system may be any or all of the components of a standard colour television signal. A plurality of channels may be contemporaneously transmitted over one fibre each by modulation of a different light colour, each channel having its own L.E.D. and detector operatively associated with filter means chosen in accordance with the particular colour light appertaining to the channel concerned.

Alternatively the system may be arranged to operate on a time shared multiplex basis whereby a plurality of channels are transmittable. A further alternative mode of operation would be a combination of colour multiplex transmission, and time shared multiplex transmission.

A system according to the present invention may include an optical negative feedback arrangement, whereby operation of the system or parts thereof is linearised. The feedback arrangement may comprise one or more detectors positioned to receive light fed to the optical transmission line and to produce in dependence thereon a feedback electrical signal which is amplified and utilised for negative feedback purposes.

The detector or detectors used for negative feedback purposes may be positioned adjacent the light emitting diode to collect overspill light, i.e. light intended for transmission but not collected by the optical fibre. Alternatively this detector or these detectors utilised for negative feedback may be positioned adjacent the fibre with an index matching medium interposed therebetween so that some of the light transmitted through the fibre can be bled off and utilised for feedback purposes.

Some exemplary embodiments of the invention will now be described with reference to the accompanying drawings in which.

Figure 1:
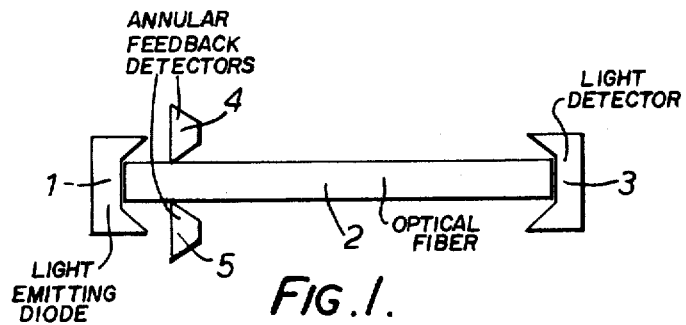
FIG. 1 is a generally schematic sectional front elevation of an optical fibre coupled to a light emitting diode and showing light detectors used for feedback purposes.

Referring now to FIG. 1 a system for the optical transmission of analogue television (T.V.) signals comprises a light emitting diode 1 fed with analogue electrical T.V. signals and providing corresponding light signals which are transmitted along an optical fibre 2 to a light detector 3. The light emitting diode 1 may be of any conventional type and the light detector 3 is conveniently a reverse biased silicon junction detector. The optical fibre 2 is a conventional multimode type having a glass core of a first refractive index surrounded by a glass annulus or cladding having a different refractive index.

In operation of the system, light produced as a result of electrical signals applied to the L.E.D. 1 is transmitted along the fibre 2 through the core and cladding and collected at the detector 3 to be re-converted to electrical television signals. In order to linearise operation of the L.E.D. a feedback detector 4, 5 of annular form is provided which collects overspill light from the junction between the L.E.D. and the end of the optical fibre 2. Light from the detector 4, 5 is suitably amplified as will hereinafter be described and applied to the L.E.D. in a suitable phase so as to provide the advantageous linearising effects well known to be associated with a negative feedback. The annular photo detector 4, 5 might conveniently be a mesa.

Figure 2:
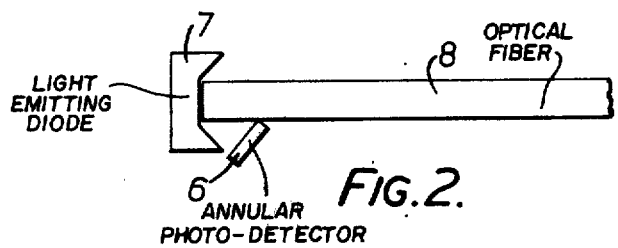
FIG. 2 is a generally schematic front elevation of an alternative arrangement to FIG. 1.
Figure 3:
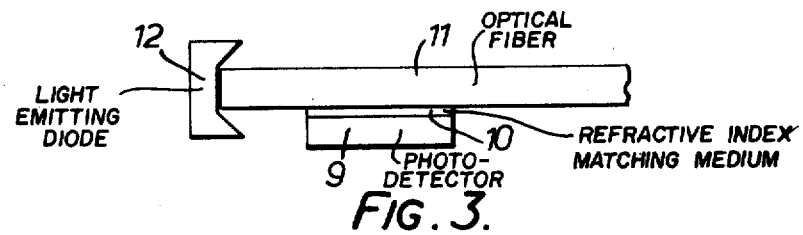
FIG. 3 is another generally schematic front elevation of a further alternative arrangement to the arrangement of FIG. 1.

Referring to FIG. 2 an alternative arrangement is shown in which a conventional new annular photo detector 6 is provided to collect light overspilling from an L.E.D. 7 which is arranged to feed an optical fibre 8.

As an alternative to utilising overspill light for feedback purposes as hereinbefore described with reference to FIGS. 1 and 2 an arrangement may be provided in which a photo detector 9 is optically coupled through a refractive index matching medium 10 to an optical fibre 11 which is fed from an L.E.D. 12. In this case a proportion of the light normally intended for transmission from the L.E.D. 12 through the cladding of the optical fibre 11 passes through the index matching medium and is utilised by the photo detector 9 for feedback purposes.

Figure 4:
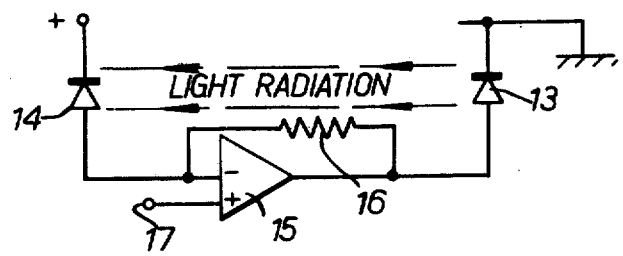
FIG. 4 is a generally schematic circuit diagram of an electrical feedback system.

A typical feedback circuit is shown schematically in FIG. 4 where overspill light from an L.E.D. 13, stimulated by electrical T.V. analogue signals, is collected by a reverse biased photo detector 14 and fed via an amplifier 15 the gain of which is defined by a resistor 16 to the L.E.D. 13 as a negative feedback signal, the electrical analogue T.V. input signals being fed to input terminal 17. Instead of using the single amplifier 15 to provide the required phase change two amplifiers may be serially connected to produce a similar result.

A system according to the invention is workable over line lengths of up to four kilometres depending upon fibre attenuation. The system is suitable for T.V. video signals, or alternatively the signal used may occupy a frequency band of 0.5 to 6.5 megahertz for example, and this would have the advantage that distortion which may be caused by thermal effects at lower frequencies i.e. below 15 megahertz would be avoided. Additionally it would enable a.c. and d.c. drives for the L.E.D. as would be required if a system operating to d.c. were used, to be separated resulting in improved drive efficiency. The bias may with this arrangement be provided by circuits not involved in providing the power drive for the L.E.D. and by using transformers a higher drive voltage may be used with a corresponding saving in drive current. The L.E.D. may be permanently bonded to a short length of fibre prior to installation or it may have a channel provided to guide the optical fibre to the active area. The light detector may be similarly constructed and may incorporate a transimpedance amplifier.

What we claim is:

1. A data transmission system comprising, in combination, a light emitting diode for producing light signals in response to electrical signals supplied thereto, an optical fiber transmission line having one end disposed adjacent said diode to form a junction for receiving and transmitting said light signals, a light detector of annular configuration surrounding said transmission line disposed adjacent said junction for collecting the overspill light emanating from said diode adjacent said junction and for converting said collected light to electrical signals and negative feedback circuit means including an amplifier connected to the output of said light detector for applying said collected light electrical signals to said diode in a predetermined phase relationship therewith to control and linearize the operation of said diode.

2. A data transmission system in accordance with claim 1 wherein said light detector is a reverse biased silicon junction detector.

3. A data transmission system in accordance with claim 2 wherein said optical fiber transmission line is of a multimode type.

* * * * *